(12) United States Patent
Vasin et al.

(10) Patent No.: US 6,244,041 B1
(45) Date of Patent: Jun. 12, 2001

(54) LIQUID-PROPELLANT ROCKET ENGINE CHAMBER AND ITS CASING

(75) Inventors: Alexandr Alexandrovich Vasin, Moscow; Stanislav Dmitrievich Kamensky, Khimki; Boris Ivanovich Katorgin, Khimki; Alexei Ivanovich Kolesnikov, Khimki; Viktor Petrovich Nosov, Moscow; Anatoly Ivanovich Stavrulov, Khimki; Vladimir Vladimirovich Fedorov, Moscow; Vladimir Konstantinovich Chvanov, Khimki, all of (RU)

(73) Assignee: Otkrytoe Aktsioneroe Obschestvo "Nauchao-Proizvodatveabnoe Obiedianie Nauchao-Proizvodatvesnoe Obiediane "Energomash" Imeni Akademika V.P. Glushko" (RU)

( * ) Notice: Subject to any disclaimer, the term of this patent is extended or adjusted under 35 U.S.C. 154(b) by 0 days.

(21) Appl. No.: 09/394,259

(22) Filed: Sep. 10, 1999

(30) Foreign Application Priority Data

Sep. 21, 1999 (RU) ................................................ 99101161

(51) Int. Cl.[7] ...................................................... F02K 9/95

(52) U.S. Cl. .......................................... 60/258; 60/39.826
(58) Field of Search ......................... 60/257, 258, 39.826

(56) References Cited

U.S. PATENT DOCUMENTS

| | | |
|---|---|---|
| 3,595,023 | 7/1971 | Stockel ................................... 60/260 |
| 3,780,952 | * 12/1973 | Huang .............................. 60/39.74 A |
| 4,211,073 | 7/1980 | Guillot .................................... 60/746 |
| 4,621,492 | 11/1986 | von Pragenau ......................... 60/258 |
| 4,894,986 | 1/1990 | Etheridge ............................... 60/258 |

OTHER PUBLICATIONS

Liquid–Propellant Rocket Engine Design and Engineering, Moscow 1989 (English Translation); English x1 Lation of Portions of prior art.

Sutton, G. P. and Ross, D. M., "Rocket Propulsion Elements" John Wiley 4th ed, pp. 265, 275, 299–301, 1976.*

* cited by examiner

Primary Examiner—Timothy S. Thorpe
Assistant Examiner—Ehud Gartenberg
(74) Attorney, Agent, or Firm—Blakely Sokoloff Taylor & Zafman

(57) ABSTRACT

The invention relates to rocket engine manufacturing, and may also be used in aircraft engine manufacturing. A chamber comprises a casing, ignition means and a mixing head. The mixing head consists of an internal injector face, a middle bottom, an external bottom. Bipropellant injectors are fixed in the internal injector face and the middle bottom. A portion of the bipropellant injectors are mounted projecting from the internal injector face, while another portion are recessed in the internal injector face. The ignition means are made from jet injectors mounted in a structural casing behind the internal injector face. Axes of diverging ports of jet injectors are positioned at an acute angle to an outlet from the structural casing and deflected in a circle in a lateral plane from the longitudinal axis of the structural casing in an identical direction. The chamber casing comprises a combustion chamber and a nozzle, made from an external structural envelope and an internal fire wall. A regenerative cooling passage is positioned between the external structural envelope and the internal fire wall. A ring-like slot of a gas-screen belt is made in the internal fire wall before the nozzle throat. The regenerative cooling passage of the chamber is made with a branched inlet. One of its branches communicates with the space of the chamber regenerative cooling passage between the nozzle throat and its scarf, a second branch—with the space of the chamber regenerative cooling passage before the nozzle throat, and a third—with the space of the chamber regenerative cooling passage before the ring-like slot of the gas-screen belt.

10 Claims, 5 Drawing Sheets

LIQUID-PROPELLANT ROCKET ENGINE CHAMBER AND ITS CASING

FIELD OF THE INVENTION

The invention relates to rocket engine manufacturing and can also find application in aircraft engine manufacturing.

BACKGROUND OF THE INVENTION

Chambers in which liquid and gaseous propellant components or products of their gas generation interact are widely used in engineering.

A combustion chamber is known that is mainly used for gas turbines (U.S. Pat. No. 4,211,073). The chamber comprises a mixing head consisting of an internal injector face, external and middle bottoms, and a bipropellant injector oriented along the chamber axis. The chamber casing consists of an external structural envelope and in internal fire wall, between which a regenerative cooling passage is located. Side injectors are uniformly displaced along the circumference of the chamber casing. It is difficult to use this device as a combustion chamber of high-thrust liquid-propellant rocket engines (LRE), in particular because of the fact that in practice it is not always possible to reliably ensure propellant ignition when a multi-injector mixing head is used.

A liquid-propellant rocket engine (LRE) chamber is known (U.S. Pat. No. 4,621,492).

In this chamber a mixing head comprises an internal injector face, external and middle bottoms. The injectors of the mixing head are fixed in the face and bottoms. The injectors comprise three ferrules inserted concentrically one in another and located in injector bodies. The ferrules are each made with a central axial channel for feeding a liquid oxidizer. There are injectors, protruding bodies of which extend beyond the internal injector face.

This technical solution is not effective for large-size chambers, since injectors of a single type are used therein. Furthermore, the injectors are complex in design, since they consist of three ferrules concentrically inserted one in another. The known technical solution is designed for a liquid oxidizer fed along the injector axis. The design of the injector requires substantial further development for use of a gaseous oxidizer or an oxidizing gas. Besides, in some cases of large-size LRE chambers, it is not possible to consider the feeding of the igniting mixture through a central injector of the mixing head to be completely reliable and efficient.

The technical solution most similar to the LRE chamber is the LRE chamber and its composite parts used in the American SSME rocket engine (Monograph by G. G Gakhun, V. I. Baulin, V. A. Volodin et al., "Liquid-Propellant Rocket Engine Design and Engineering," Moscow, 1989, page 124, Fig. 6.40, page 135, Fig. 7.12).

The chamber comprises a casing and a mixing head. The mixing head has front, intermediate and external bottoms and injectors mounted therein. All of the injectors used in this technical solution may be functionally divided into main injectors and injectors forming oscillation-preventing partitions. The chamber casing has an external structural envelope and an internal fire wall with a ribbed external surface, between which a regenerative cooling passage is formed.

The chamber is used for LREs operating on oxygen-hydrogen propellant components. The chamber and the composite parts thereof, including ignition and mixing systems, are designed for such propellant components. The direct use of this known technical solution for LREs operating an oxygen-kerosene propellant components is impossible and requires additional inventive activity.

Different designs of LRE chamber casings are widely used in rocket engine manufacturing.

A bipropellant rocket engine is known (U.S. Pat. No. 4,894,986).

The chamber casing of this engine consists of an external structural envelope and an internal fire wall, between which a regenerative cooling passage is formed. This passage has an inlet and an outlet. The passage inlet is located on the nozzle part of the casing.

An SSME LRE chamber casing is also known (Monograph by G. G. Gakhun, V. I. Baulin, V. A. Volodin, et al., "Liquid-Propellant Rocket Engine Design and Engineering," Moscow, 1989, page 124, Fig. 6.40.5).

The casing also consists of an external structural envelope and an internal fire wall, between which a regenerative cooling passage is positioned. The cooling passage inlet is located on a nozzle of the casing.

There are possible reserves for increasing the cooling efficiency in the technical solution disclosed in "U.S. Pat. No. 4,894,986" and in the SSME engine "Monograph by G. G. Gakhun, V. I. Baulin, V. A. Volodin et al., 'Liquid-Propellant Rocket Engine Design and Engineering,' Moscow, 1989, page 124, fig. 6.40.5." In the first place this is due to the fact that feeding the cooling component of the propellant in the known designs is not carried out onto the most thermally stressed places of the internal fire wall of the casing, and in the second place, due to the fact that internal cooling of the chamber through slots is not provided. Theses limitations do not make it possible to additionally increase the temperature in the external layer of combustion products, i.e. on the internal fire wall of the casing.

The technical solution most similar to the claimed chamber casing is the casing of an LRE chamber, which comprises a chamber and a nozzle which consist of an external structural envelope and an internal fire wall with a regenerative chamber cooling passage located between them, wherewith a ring-like slot of a gas-screen belt is made in the internal fire wall (U.S. Pat. No. 3,595,023).

This construction also has limitations in the part relating to reduction of the temperature of the internal fire wall of the casing in the most thermally stressed places, both during engine start and upon reaching the operational mode of the engine, and has additional reserves for increasing the efficiency of cooling the internal fire wall of the chamber casing.

SUMMARY OF THE INVENTION

The object at the base of the present invention is to create a large-size chamber for a powerful LRE operating on propellant components—high-temperature oxidizing generator gas produced by the products of kerosene combustion in oxygen, and kerosene—and ensuring stable operation in respect to the possibility of high-frequency oscillations occurring both during engine start and in the operating mode, and also to create a chamber casing ensuring enhancement of cooling the fire wall in the most thermally stressed places of the casing, both during the start and in the operating mode.

The technical result attained upon use of the proposed inventions is enhancement of the technical-economical characteristics of an LRE chamber and its casing, which makes it possible to increase the service life of the engine with multiple starts.

The essence of the proposed invention, i.e. LRE chamber, consists of the following.

A liquid-propellant rocket engine chamber comprising a structural casing, in which regenerative cooling passages are made, ignition means and a mixing head consisting of an internal fire face, a middle bottom, an external bottom, and of bipropellant injectors fixed in the internal fire face and the middle bottom, wherein the bipropellant injectors are mounted both projecting from the internal fire face to form partitions inside the structural casing of the chamber and recessed in the internal fire face, is distinctive in that the ignition means are made of spray injectors mounted behind the internal fire face in the structural casing, axes of injection ports of the spray injectors are positioned at an acute angle to an outlet from the structural casing and are deflected in a circle in a diametral plane from a longitudinal axis of the structural casing in the same direction, the axis of the injection port for each spray injector is positioned to cross the axis of the injection port of an adjacent spray injector.

In a particular case of the invention, the deflection angle of the injection port for each spray injector is defined by the angle of deflection of the axis of the spray injector from its projection onto the axis of the structural casing in a plane positioned on the axis of the injection port and parallel to the axis of the structural casing and is selected to be within the range of from 60° to 80°, while the distance L from the longitudinal axis of the structural casing to the projection of the injection port axis of the spray injector onto a plane positioned perpendicular to the axis of the structural casing and in the center of the spray injector, is selected to be within the range of from 0.05 to 0.35 of the internal diameter $D_2$ of the structural casing in the place of mounting the spray injectors. With other values of this relationship a stable distribution of the igniter over the cross section of the combustion chamber, which is undesirable from both the point of view of stability of ignition conditions and from the point of view of reliability of firing.

In a particular case of realization of the invention, the inlets of the spray injectors are joined by a common collector for supplying an igniting component, while the injection ports of spray injectors are positioned in the diametral plane of the structural casing between the internal injector face and the ends of the bipropellant injectors projecting therefrom.

Tapered bores along the axes of recessed bipropellant injectors may be made in the internal injector face.

In a particular case of realization of the invention, ferrules may be introduced into the chamber, which ferrules are mounted inside the bodies projecting out from the internal injector face of bipropellant injectors to provide axial feed of oxidizing gas therethrough. Helical ribs may be made on the ferrules to form helical channels therebetween for feeding fuel into the structural casing, which communicate with ports made in the body of a bipropellant injector between the internal injector face and the middle bottom.

In a particular case of realization of the invention, extensions may be introduced into the chamber, the extensions being mounted on bodies recessed in the injector face of bipropellant injectors, for the axial supply of an oxidizing gas therethrough, a ring-like slot space may be made between the extension and body of a bipropellant injector to feed fuel into the structural casing, the space communicating with ports made in the wall of the extension between the internal injector face and the middle bottom.

The ports for the bipropellant injectors located near the wall of the structural casing may be made with a smaller diameter as compared with the ports of the remaining bipropellant injectors to increase the hydraulic resistance when fuel is fed.

The bodies of the bipropellant injectors may be mounted projecting from the internal injector face with the possibility of forming a ring-like partition and radial partitions in the structural casing behind it.

The ports may be positioned tangentially relative to the axial feed of the oxidizing gas.

The bipropellant injectors recessed in the internal injector face may be made with different hydraulic resistance during fuel feed and divided as regards fuel flow rate into three groups with the possibility of ensuring a difference in the fuel flow rate between each group of from 3% to 10% at the nominal mode, wherein the bipropellant injectors may be fixed in the internal injector face and the middle bottom in such a manner that bipropellant injectors of different groups are adjacent.

The essence of the invention for the chamber casing consists of the following.

A liquid-propellant rocket engine chamber casing, comprising a combustion chamber and a nozzle, which are made from an external structural envelope and an internal fire wall positioned between the external structural envelope and the internal fire wall and communicating by a first inlet upstream a nozzle throat with an external surface of a casing of the combustion chamber, a ring-like slot of a gas-screen belt, the slot being made in the internal fire wall upstream of a nozzle throat from the side of the combustion chamber, designed for mounting a mixing head, is distinctive in that the chamber regenerative cooling passage is additionally provided with a second inlet and a third inlet, which communicate with the external surface of the chamber casing, the second inlet communicating with the space of the chamber regenerative cooling passage between the nozzle throat and its scarf, the third inlet communicating with the space of the chamber regenerative cooling passage upstream the ring-like slot of the gas-screen belt from the side of the combustion chamber, designed for mounting a mixing head.

The first inlet, the second inlet and the third inlet may be joined by a pipe that is branched and located outside the chamber.

A helical ribbing may be made on the internal surface of the internal fire wall before the ring-like slot of the gas-screen belt.

In a particular case of realization of the invention, two additional ring-like slots of the gas-screen belts, made in the internal fire wall and positioned before the aforesaid ring-like slot of a gas-screen belt from the side of the combustion chamber, designed for mounting a mixing head, may be introduced into the chamber casing, wherein one additional ring-like slot of a gas-screen belt is positioned within the combustion chamber part designed for connection to the mixing head.

Also in a particular case of realization of the invention, the aforesaid ring-like slot of a gas-screen belt and adjacent thereto additional ring-like slot of a gas-screen belt may be made with a common cooling channel and be separated from each other by helical ribbings, the ribs of which are directed to opposite sides.

The aforesaid advantages and also distinctive features of the present invention will become more clear from its best embodiment with reference to the accompanying drawings.

DETAILED DESCRIPTION OF THE PREFERRED EMBODIMENTS

Figure 1:
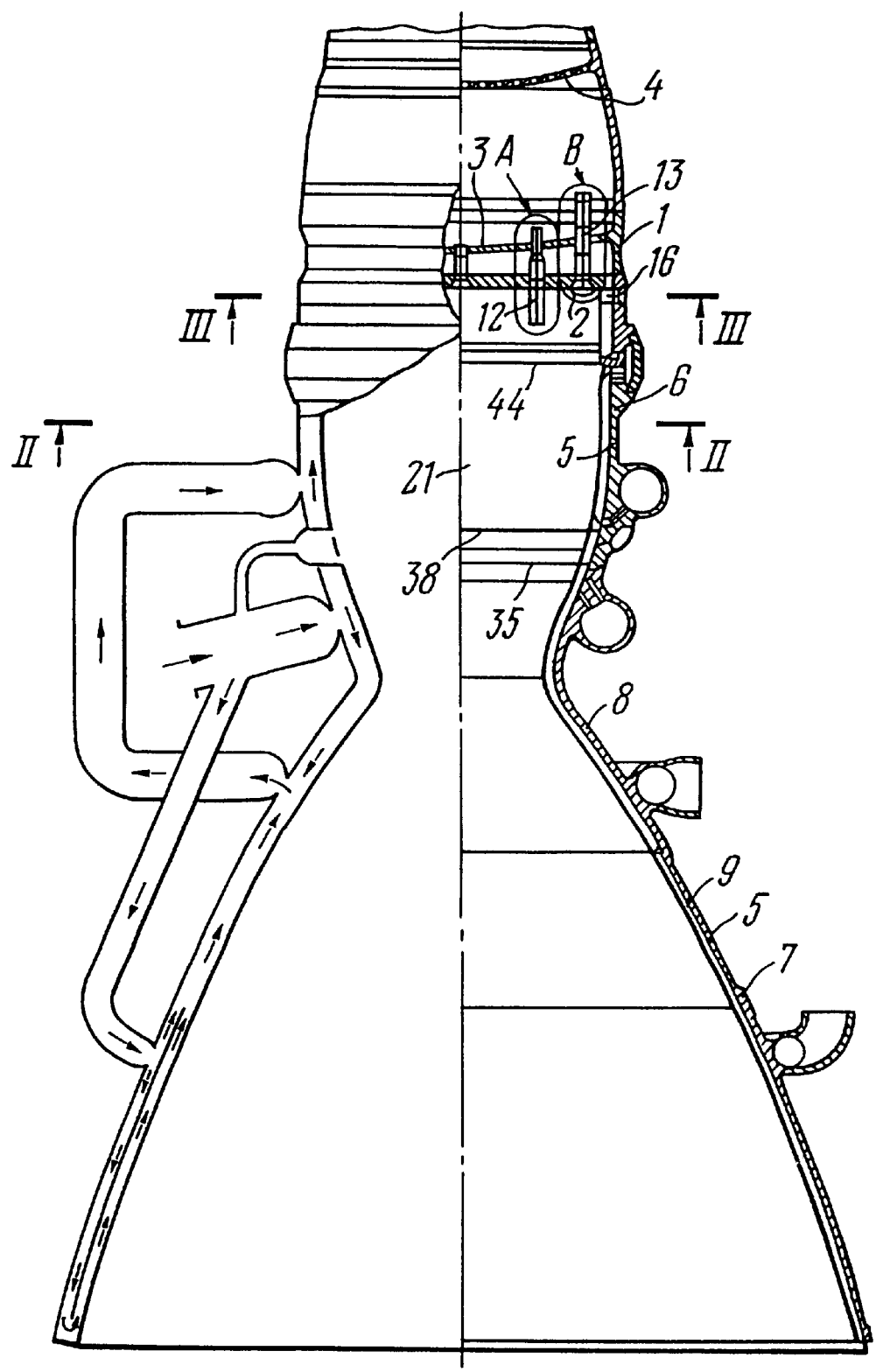
FIG. 1 shows an LRE chamber in section.

The construction of an LRE chamber shown in FIG. 1 can be described as follows.

A mixing head 1 comprises an internal injector face 2, a middle bottom 3 and an external bottom 4 and injectors 12, 13 mounted in the face and in the bottoms. The mixing head 1 is connected by welding (in principle, it may be a flange joint) to a casing 5 of the chamber, the casing 5 comprising a combustion chamber 6 and a nozzle 7. The chamber casing also includes an external structural envelope 8 and an internal fire wall 9.

Figure 2:
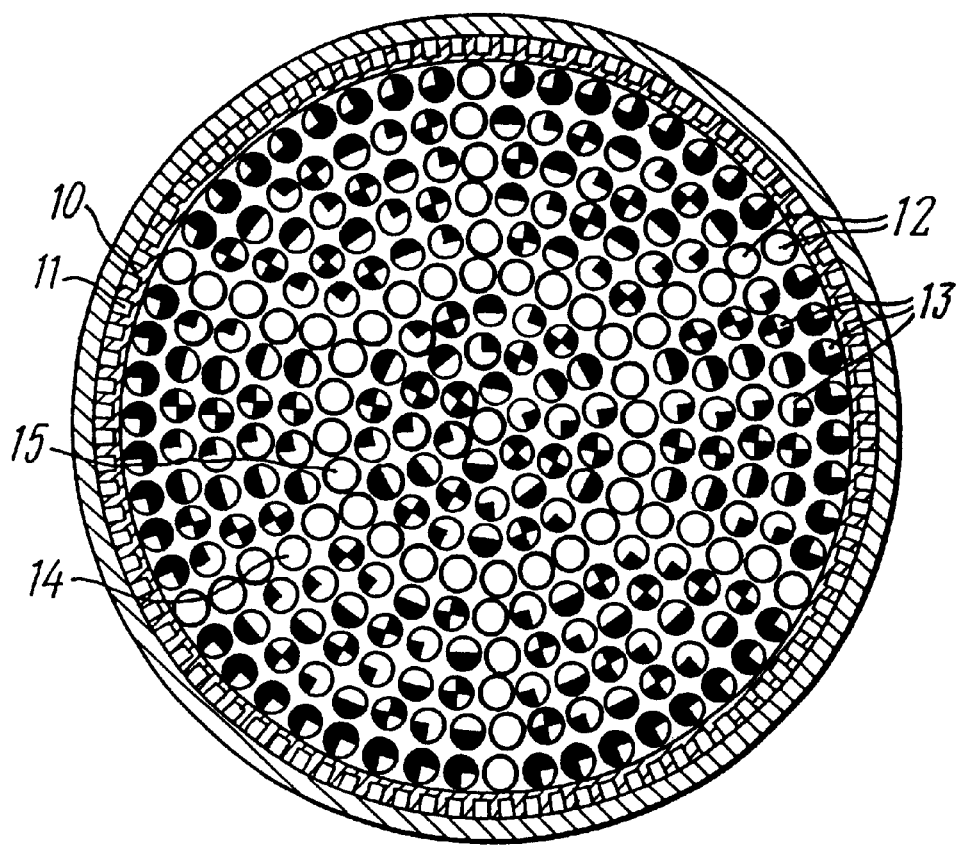
FIG. 2 is a schematic section II—II (FIG. 1) with a view on the internal fire face with injectors.

As seen in FIG. 2, the internal fire wall has ribs 10, between which grooves 11 are positioned, forming a passage of regenerative cooling for the internal fire wall 9. The mixing head 1 has injectors 12 protruding from the internal injector face 2 (see FIGS. 1, 5, 2) and injectors 13 recessed in the internal injector face (see FIGS. 1, 2, 6). The injectors 12 form radial partitions 14 and a ring-like partition 15 in the fire space of the chamber (see FIG. 2). The shape of these partitions is not strictly linear and ring-like because of the compact positioning of the injectors 12 and 13 in an internal injector face 2.

Figure 3:
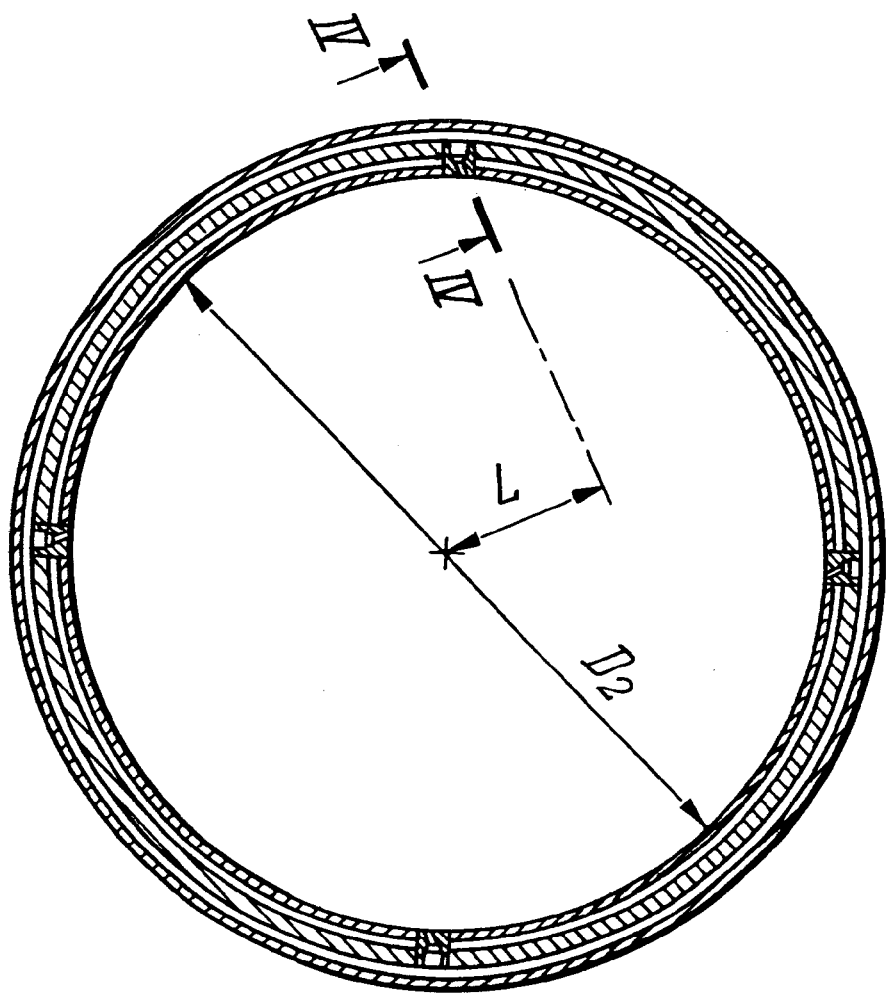
FIG. 3 is the section III—III in FIG. 1.
Figure 4:
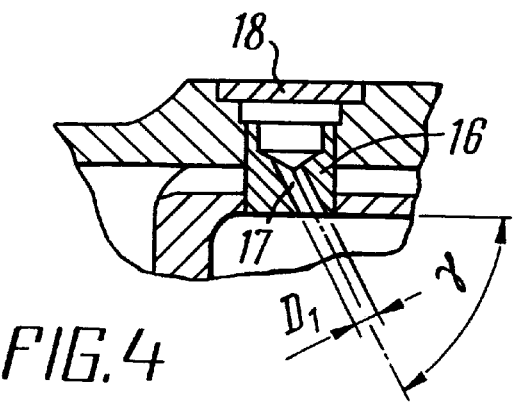
FIG. 4 is the section IV—IV in FIG. 3.

Injectors of igniter 16 (see FIGS. 1, 3, 4) having injection ports 17 of diameter $D_1$ are mounted in the combustion chamber near the internal injector face 2. Axes of these ports have the same certain directivity in space that is defined by angle γ (angle γ lies in a vertical plane passing through the injector axis and is measured between the axis of the injector and its projection onto a vertical axis directed towards a chamber outlet) and the shortest distance L from the center of the chamber to the projection of the injector axis onto a plane perpendicular to the chamber axis and passing through the center of this injector (see FIG. 3). In this embodiment there are four injectors of igniter 16. They are uniformly positioned along a circle and hydraulically joined by a common collector 18. (In principle another number, for example, 3 or 6, and location of these injectors are possible.)

The distance L is made equal to 0.2 times the internal diameter $D_2$ of the casing in the place of mounting these injectors. In the general case, it is advisable that this distance be selected to be from 0.05 to 0.35 the diameter $D_2$. At smaller or larger values, mixing of a starting charge of propellant and igniter components during engine start worsens.

The angle γ of deflection of the port $D_1$ axis towards the outlet (see FIG. 4) is 70°. During the start modes of modern LREs, the optimum value of this angle is within the range of from 60 to 80°.

Figure 5:
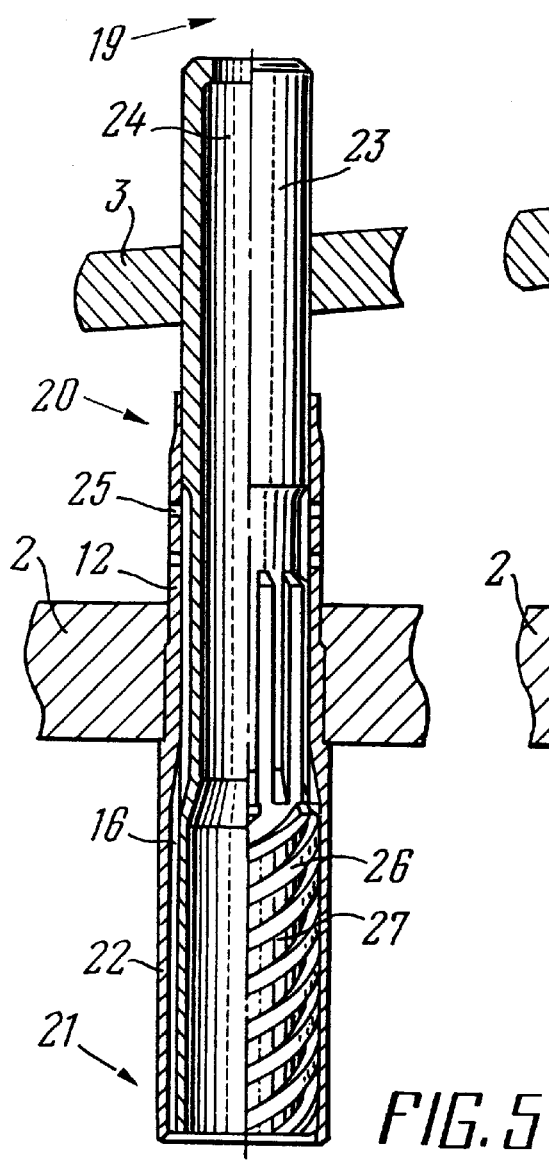
FIG. 5 is the detail A in FIG. 1 with the projecting injector.

The injectors 12 projecting from the internal injector face are shown in FIG. 5, wherein 19 is oxidizing gas space of the mixing head 1, 20 is the fuel space of the mixing head 1, 21 is the fire space of the combustion chamber. An injector 12 has a projecting part 22 and is fixed to the face 2 and bottom 3 by, for example, soldering.

A ferrule 23 with an axial oxidizing gas feed 24 is inserted into the injector 12. The injector also has ports 25 and helical ribs 26 on the ferrule 23. Helical channels 27 for passing fuel and cooling the injector part 22 projecting into the fire space are provided between the helical ribs 26. Injectors 12 located near the internal fire wall 9 of the chamber casing are made with increased hydraulic resistance to fuel as compared with other injectors 12. This may be achieved, for example, by reducing the diameters of the ports 25.

Figure 6:
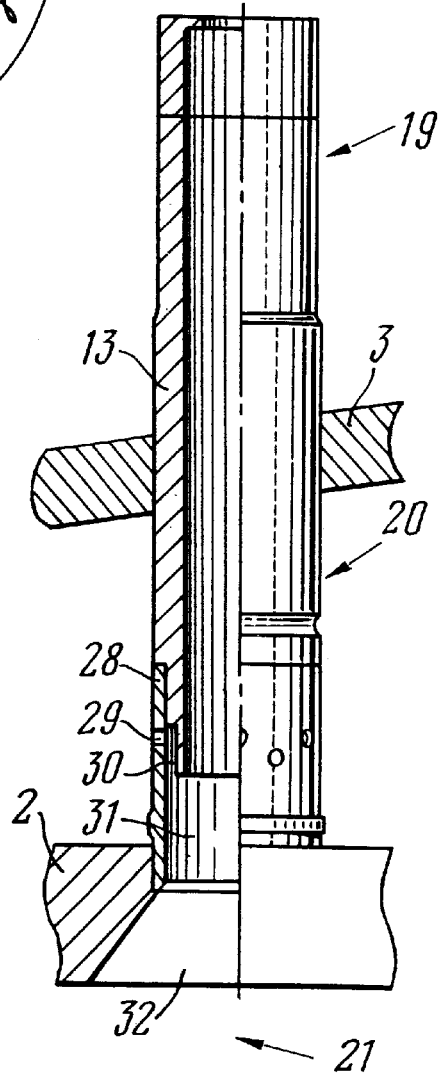
FIG. 6 is the detail B in FIG. 1 with the injector recessed in the internal injector face.

An injector 13 recessed in the internal injector face 2 (see FIG. 1) is shown in FIG. 6. This injector, like the preceding injector, is bipropellant with axial feed of oxidizing gas. The injector comprises an injector 13 body and an injection extension 28 fixed to the body by, for example, soldering. The injector itself is set and firmly fixed, for example, by soldering, in the face 2 and bottom 3. There are centrifugal, tangentially located fuel ports 29 in it. The ports 29 communicate with a ring-like slot space 30, directly communicating with an outlet space 31. The outlet space 31 of the injector 13 exits into a tapered bore 32 made in the internal injector face 2.

The injectors, except those located near the internal fire wall of the chamber casing, should differ in mutual location and definite step in the fuel flow rate, and therefore they are divided into groups according to fuel flow rate growth (three groups are given consideration as an example). In this case, the injectors of different groups are made in such a way that the mass flow rates of fuel for adjacent groups at the nominal operation mode of the engine differ by no less than 3% and no more than 10%. The introduction of injectors with different flow rates is necessary in order to reduce the effects of high-frequency oscillations at operating modes of the engine. During the mounting of the injectors 13 on the mixing head 1, the injectors are arranged so that injectors of different groups are adjacent each other, the groups being positioned in the chamber according to a definite law (for example, by cyclic sequential helical repetition of the injector arrangement from the first to the last group). A schematic representation of the arrangement of injectors 13 on the mixing head is shown in FIG. 2 as a section A—A. Wherein, each injector of a corresponding group is designated by a circle with a wholly colored sector of corresponding size:

An injector of the first group is designated by a colored sector which is ¼ the size of the circle;

An injector of the second group is designated by a colored sector which is ½ the size of the circle;

An injector of the third group is designated by two diametrically opposite colored sectors which are ¼ the size of the circle.

The injectors 13, which are positioned at the internal fire wall (marked by colored sectors having a size ¾ the size of the circle), are made with increased hydraulic resistance along the fuel supply line, i.e. ensuring a reduced fuel flow rate as compared with other aforesaid injectors 13.

Figure 7:
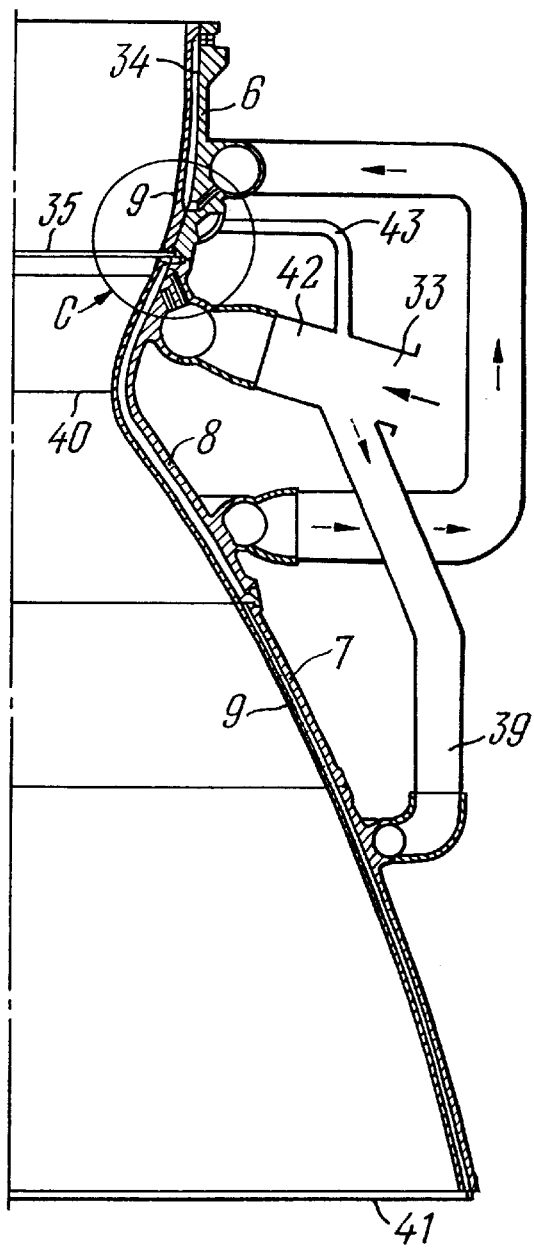
FIG. 7 is the casing of the LRE chamber shown in FIG. 1 with one ring-like slot of a cooling gas-screen belt located before the throat.

The chamber casing (FIG. 7) consists of a combustion chamber 6 and a nozzle 7 (the casing is shown in FIG. 7 without the mixing head in FIG. 1 and is a part of the LRE chamber). The chamber casing comprises an external structural envelope 8 and an internal fire wall 9. The ribs 10 and the grooves 11 of the regenerative cooling passage are described above in the description relating to FIG. 2.

Figure 8:
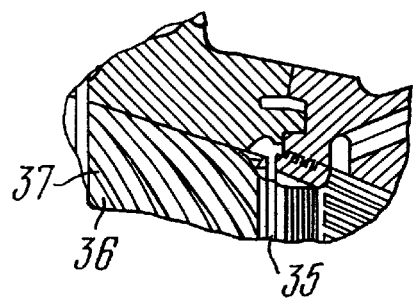
FIG. 8 is the detail C in FIG. 7 for a chamber with one ring-like slot of a cooling gas-screen belt located before the nozzle throat.

The casing has an inlet 33 and an outlet 34 of the regenerative cooling passage. A ring-like slot 35 of the gas-screen belt is made in the internal fire wall 9 of the casing. Helical ribbings having helical ribs 36 and helical grooves 37 (FIG. 8) are made on the external side of the internal fire wall 9 before the ring-like slot 35 along the regenerative cooling passage.

Figure 9:
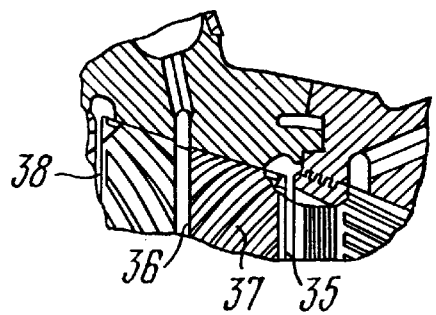
FIG. 9 is a variant of detail C in FIG. 7 for a chamber with two ring-like slots of a cooling gas-screen belt located before the nozzle throat, as shown in FIG. 1.

FIG. 9 shows a variant of the detail III of the casing with two ring-like slots 35 and 38 of the gas-screen belts. The helical ribs 36 and helical grooves 37 are also shown here.

As seen in FIG. 7, the inlet into the chamber cooling passage is made branched. A branch 39 is directed into the space of the cooling passage between a nozzle throat 40 and a scarf 41. A branch 42 is directed to a space of the cooling passage directly before the nozzle throat 40, while a branch 43 is directed into the cooling passage of the gas-screen belts of FIG. 9.

A ring-like slot 44 of the gas-screen belt (FIG. 1) is made in the point of connection of the chamber casing 5 to the mixing head 1.

In other embodiments, this slot 44 may be made in the same way, or in the casing separately, or in the mixing head separately. The structural execution of this slot may be similar to the ring-like slot 35 of the gas-screen belt located before the nozzle throat 40.

The external bottom 4 may be made as an inlet pipe, fixed in an air-tight manner to the middle bottom 3, for example, by welding, as is shown in FIG. 1.

The LRE chamber and the chamber casing thereof operates in the following manner.

The cooling fuel is fed to the chamber cooling passage between the external structural envelope 8 and the internal fire wall 9 and enters the chamber fire space 21 through the injectors 12 and 13 and the ring-like slots 35, 38 and 44 of the gas-screen belts as shown by the arrows in the drawings.

Oxidizing gas with a large amount of excess oxygen is fed through the external bottom 4 and injectors 12 and 13 into the chamber fire space 21.

In accordance with the LRE start program, the igniter is fed into the chamber fire space 21 through the injectors 16 having injection ports 17. As a result an interaction process starts between the propellant components in the fire space 21, the pressure grows, passage of the engine to the operating mode is ensured. The selected direction of the axes of the injection ports 17 ensures stability of the ignition conditions for the propellant components while the engine is reaching the rated mode.

The presence of helical ribs and grooves 36 and 37 ensures rotation of flows. This improves the bearing of the cooling flow against the internal fire wall of the casing 9 and promotes improvement of the cooling conditions, and thus excludes the possibility for the chamber casing walls to burn out.

The proposed LRE chamber and its casing may be most successfully used in rocket engineering.

What is claimed is:

1. A liquid-propellant rocket engine chamber comprising a structural casing, in which regenerative cooling passages are made, ignition means and a mixing head consisting of an internal fire face, a middle bottom, an external bottom, and of bipropellant injectors fixed in the internal fire face and the middle bottom, wherein the bipropellant injectors are mounted both projecting from the internal fire face to form partitions inside the structural casing of the chamber and recessed in the internal fire face, wherein said ignition means are made of spray injectors mounted behind the internal fire face in the structural casing, axes of injection ports of the spray injectors are positioned at an acute angle to an outlet from the structural casing and are deflected in a circle in a diametral plane from a longitudinal axis of the structural casing in the same direction, the axis of the injection port for each spray injector is positioned to cross the axis of the injection port of an adjacent spray injector.

2. A chamber according to claim 1, wherein the deflection angle of the injection port for each spray injector is defined by the angle of deflection of the axis of a spray injector from its projection onto the axis of the structural casing in a plane positioned on the axis of an injection port and parallel to the axis of the structural casing and is selected to be within a range of from 60° to 80°, while a distance L from the longitudinal axis of the structural casing to the projection of the injection port axis of the spray injector onto a plane positioned perpendicular to the axis of the structural casing and in the center of the spray injector, is selected to be within a range of from 0.05 to 0.35 of an internal diameter $D_2$ of the structural casing in the place of mounting the spray injectors.

3. A chamber according to claim 2, wherein inlets of the spray injectors are joined by a common collector for supplying an igniting component, while the injection ports of spray injectors are positioned in the diametral plane of the structural casing between the internal injector face and the ends of the bipropellant injectors projecting therefrom.

4. A chamber according to claim 1, wherein tapered bores along the axes of recessed bipropellant injectors are made in the internal injector face.

5. A chamber according to claim 1, further comprising ferrules mounted inside the bodies projecting out from the internal injector face of bipropellant injectors to provide axial feed of oxidizing gas therethrough, helical ribs are be made on the ferrules to form helical channels therebetween for feeding fuel into the structural casing, which communicate with ports made in the body of a bipropellant injector between the internal injector face and the middle bottom.

6. A chamber according to claim 1, further comprising extensions introduced into the chamber and mounted on bodies recessed in the injector face of bipropellant injectors, for an axial supply of an oxidizing gas therethrough, a ring-like slot space is made between an extension and body of a bipropellant injector to feed fuel into the structural casing, the space communicating with ports made in the wall of the extension between the internal injector face and the middle bottom.

7. A chamber according to claim 5, wherein the ports for the bipropellant injectors located near the wall of the structural casing are made with a smaller diameter as compared with the ports of the remaining bipropellant injectors to increase the hydraulic resistance when fuel is fed.

8. A chamber according to claim 5, wherein the bodies of the bipropellant injectors are mounted projecting from the internal injector face with a possibility of forming a ring-like partition and radial partitions behind it in the structural casing.

9. A chamber according to claim 5 or claim 7, wherein the ports may be positioned tangentially relative to the axial feed of the oxidizing gas.

10. A chamber according to claim 7, wherein the bipropellant injectors recessed in the internal injector face are made with different hydraulic resistance during fuel feed and divided as regards fuel flow rate into three groups with a possibility of ensuring a difference in the fuel flow rate between each group of from 3% to 10% at a nominal mode, wherein the bipropellant injectors may be fixed in the internal injector face and the middle bottom in such a manner that bipropellant injectors of different groups are adjacent.

* * * * *

UNITED STATES PATENT AND TRADEMARK OFFICE
CERTIFICATE OF CORRECTION

PATENT NO. : 6,244,041 B1
DATED : June 12, 2001
INVENTOR(S) : Vasin et al.

It is certified that error appears in the above-identified patent and that said Letters Patent is hereby corrected as shown below:

<u>Title page,</u>
Item [73], Assignee, please delete "Otkrytoe Aktsioneroe Obschestvo 'Nauchao-Proizvodatveabnoe Obiedianie Nauchao-Proizvodatvesnoe Obiediane "Energomash" Imeni Akademika V.P. Glushko'" and insert -- Oktrytoe Aktsionernoe Obschestvo "Nauchno-Proizvodstvennoe Obiedinenie "Energomash" Imeni Akademika V.P. Glushko" --.

Signed and Sealed this

Ninth Day of July, 2002

Attest:

Attesting Officer

JAMES E. ROGAN
*Director of the United States Patent and Trademark Office*